United States Patent
Ireland et al.

(10) Patent No.: US 6,544,124 B2
(45) Date of Patent: Apr. 8, 2003

(54) HANDHELD STEERING WHEEL GAME CONTROLLER

(75) Inventors: Simon Ireland, Staines (GB); James Woodward, Stanstead Abbots (GB); Ho Yiu Cheung, New Territories (HK); Kevin D. Brase, Corinth, TX (US)

(73) Assignee: Radica China Ltd., Tortola (VG)

( * ) Notice: Subject to any disclaimer, the term of this patent is extended or adjusted under 35 U.S.C. 154(b) by 0 days.

(21) Appl. No.: 09/942,495

(22) Filed: Aug. 29, 2001

(65) Prior Publication Data

US 2003/0045352 A1 Mar. 6, 2003

(51) Int. Cl.[7] .................................................. A63F 13/02
(52) U.S. Cl. ........................ 463/37; 463/36; 273/148 B
(58) Field of Search ................... 273/148 B; 463/36–39; 434/43, 45, 61–62, 69, 71

(56) References Cited

U.S. PATENT DOCUMENTS

| | | | |
|---|---|---|---|
| 5,056,787 A | * 10/1991 | Mitsuyoshi | 273/148 B |
| 5,785,317 A | * 7/1998 | Sasaki | 273/148 B |
| 5,992,849 A | * 11/1999 | Olti et al. | 273/153 R |
| 6,159,099 A | * 12/2000 | Chen | 463/37 |
| 6,203,432 B1 | 3/2001 | Roberts et al. | 463/37 |
| D441,028 S | 4/2001 | Jung | D14/324 |
| 6,251,015 B1 | 6/2001 | Caprai | 463/36 |
| 6,257,585 B1 | 7/2001 | Mendes, Jr. | 273/442 |
| 6,296,571 B1 | * 10/2001 | McVicar | 463/38 |
| 6,461,238 B1 | * 10/2002 | Rehkemper et al. | 463/6 |

FOREIGN PATENT DOCUMENTS

| | | | |
|---|---|---|---|
| WO | WO 99/24890 | * 5/1999 | |

OTHER PUBLICATIONS

Sony Corporation "Play Station Compatible™" Flyer received at Tradeshow.

Sony Corporation "Play Station Compatible™" Flyer received at Tradeshow.

* cited by examiner

*Primary Examiner*—Michael O'Neill
*Assistant Examiner*—Christina Marks
(74) *Attorney, Agent, or Firm*—Bingham McCutchen, LLP; David G. Beck

(57) ABSTRACT

A handheld game controller for use with a dedicated game system, personal computer, or other device is provided. The game controller includes two user grippable portions, typically a pair of handles, which the user holds during game play. As a result of this configuration, during use the game controller neither rests on nor becomes attached to a rigid surface such as a desk, tabletop, or other stationary object. In one aspect, one handle of the game controller is held by one of the user's hands while the second handle of the game controller, held by the user's other hand, is free to rotate within the predetermined rotational limits of the device. In a typical application, right direction and left direction control signals are sent to the game system or personal computer as a result of clockwise rotation and counter-clockwise rotation of the second handle of the game controller, respectively. A sensor coupled to the second handle generates the control signals. A tensioning system is preferably used to urge the second handle of the game controller to a null position typically located halfway between the extreme clockwise and counter-clockwise positions of the second handle.

24 Claims, 6 Drawing Sheets

HANDHELD STEERING WHEEL GAME CONTROLLER

FIELD OF THE INVENTION

The present invention relates generally to game controllers and, more particularly, to a game controller providing steering wheel motion.

BACKGROUND OF THE INVENTION

The use of controllers, and more particularly game controllers, with personal computers or gaming systems is well known. Typical game controllers include joysticks, steering wheels, throttles, and control pads and may include one or more buttons, slide switches, or rotary switches. These game controllers can be divided into handheld and stationary controllers, the stationary controllers either resting on or being clamped to a stationary object such as a desk or tabletop. Although a stationary controller may provide the user with the desired simulated environment, they are typically too bulky and too heavy for easy portability such as may be desirable with a portable gaming system. Alternately, a handheld controller may provide the user with the required portability, but at the expense of the desired functionality.

Accordingly, what is needed in the art is a handheld game controller that simulates the steering experience. The present invention provides such a controller.

SUMMARY OF THE INVENTION

A handheld game controller for use with a dedicated game system, personal computer, or other device is provided. The game controller includes two user grippable portions, typically a pair of handles, which the user holds during game play. As a result of this configuration, during use the game controller neither rests on nor becomes attached to a rigid surface such as a desk, tabletop, or other stationary object.

In one aspect of the invention, one handle of the game controller is held by one of the user's hands while the second handle of the game controller, held by the user's other hand, is free to rotate within the predetermined rotational limits of the device. In a typical application, clockwise rotation of the second handle of the game controller relative to the first handle results in a right direction control signal being sent to the game system or personal computer. Similarly, counter-clockwise rotation of the second handle of the game controller relative to the first handle results in a left direction control signal being sent to the game system or personal computer. The control signals are generated by a sensor coupled to the second handle.

In at least one embodiment, a tensioning system (e.g., spring element) is used to urge the second handle of the game controller to a null position. Preferably the null position is located halfway between the extreme clockwise position of the second handle and the extreme counter-clockwise position of the second handle.

In at least one embodiment, the game controller includes one or more button zones. Preferably each button zone is easily accessible by the user during game play. For example, the game controller can be designed with button zones that are accessible to the user's right thumb, left thumb, right index finger, left index finger, or other finger. Button zones may be comprised of analog buttons, digital buttons, or multivalue generators. The button zones may be comprised of distinct buttons or designed in the shape of a thumb ball controller.

In at least one embodiment of the invention, the game controller includes one or more visual indicators. The visual indicators can utilize an LCD display, LEDs, or other means.

A further understanding of the nature and advantages of the present invention may be realized by reference to the remaining portions of the specification and the drawings.

DESCRIPTION OF THE SPECIFIC EMBODIMENTS

The present invention provides a game controller that can be coupled via wired or wireless connections to an electronic device, such as a personal computer, dedicated game system, or other electronic device. Dedicated game systems include NINTENDO game systems (e.g., GAMECUBE, GAMEBOY ADVANCE, GAMEBOY COLOR, NINTENDO 64, Super Nintendo Entertainment System, etc.), Sony game systems (e.g., PlayStation, PlayStation 2, etc.), and others. Note that the words NINTENDO, GAMECUBE, GAMEBOY ADVANCE, GAMEBOY COLOR, NINTENDO 64, Super Nintendo Entertainment System, Sony, PlayStation, and PlayStation 2 may be subject to trademark protection.

Figure 1:
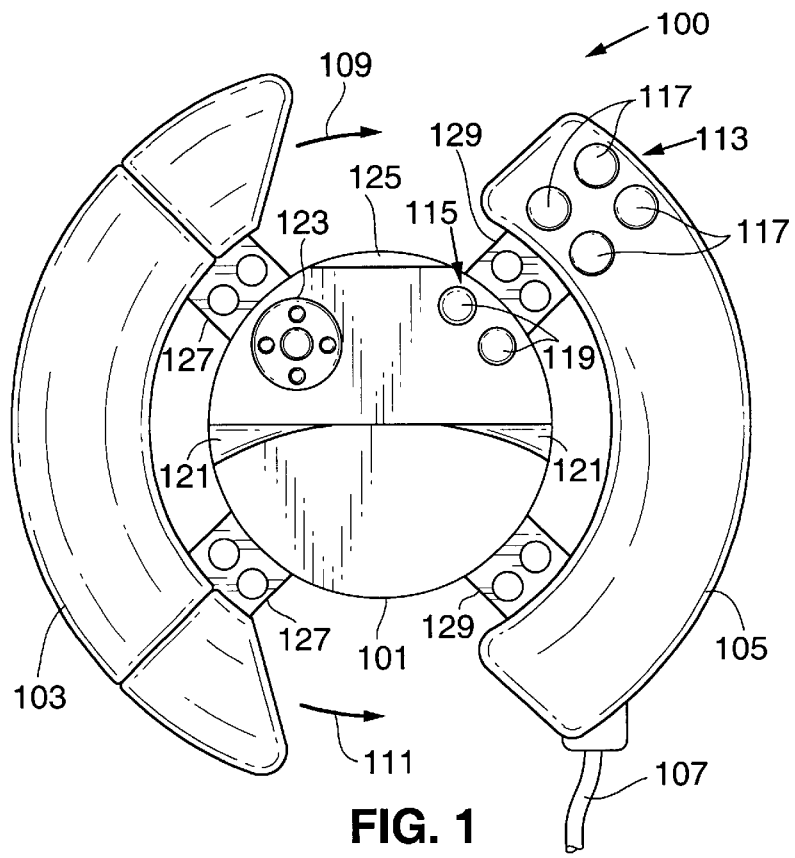
FIG. 1 is an illustration of the front of a game controller in accordance with the invention.
Figure 2:
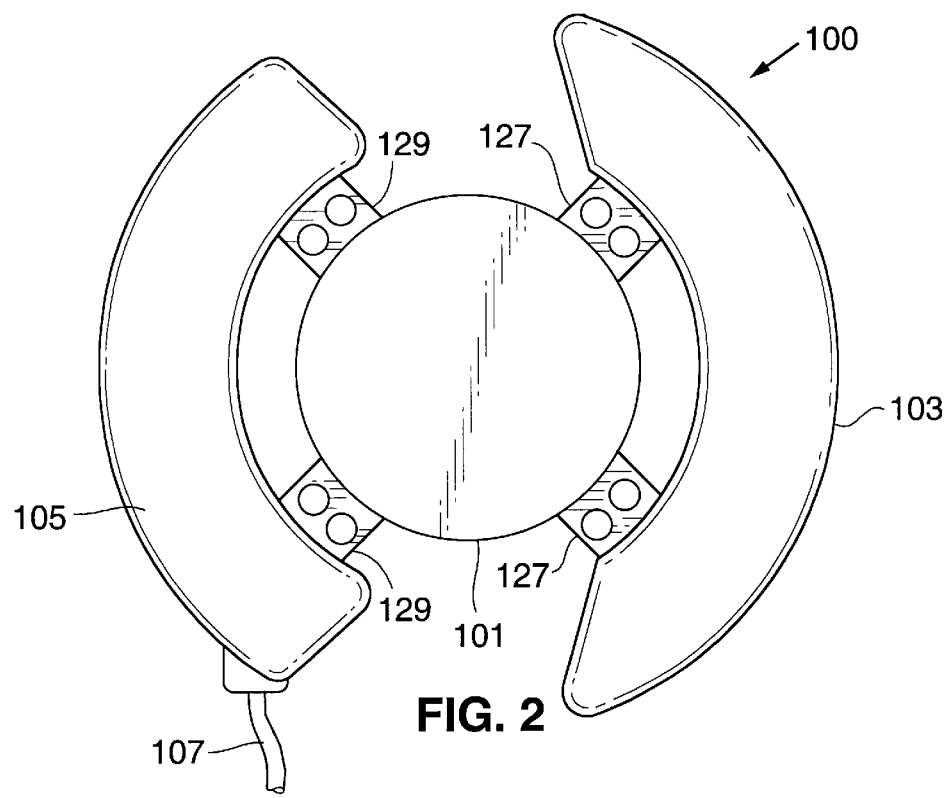
FIG. 2 is an illustration of the back of the game controller shown in FIG. 1.
Figure 3:
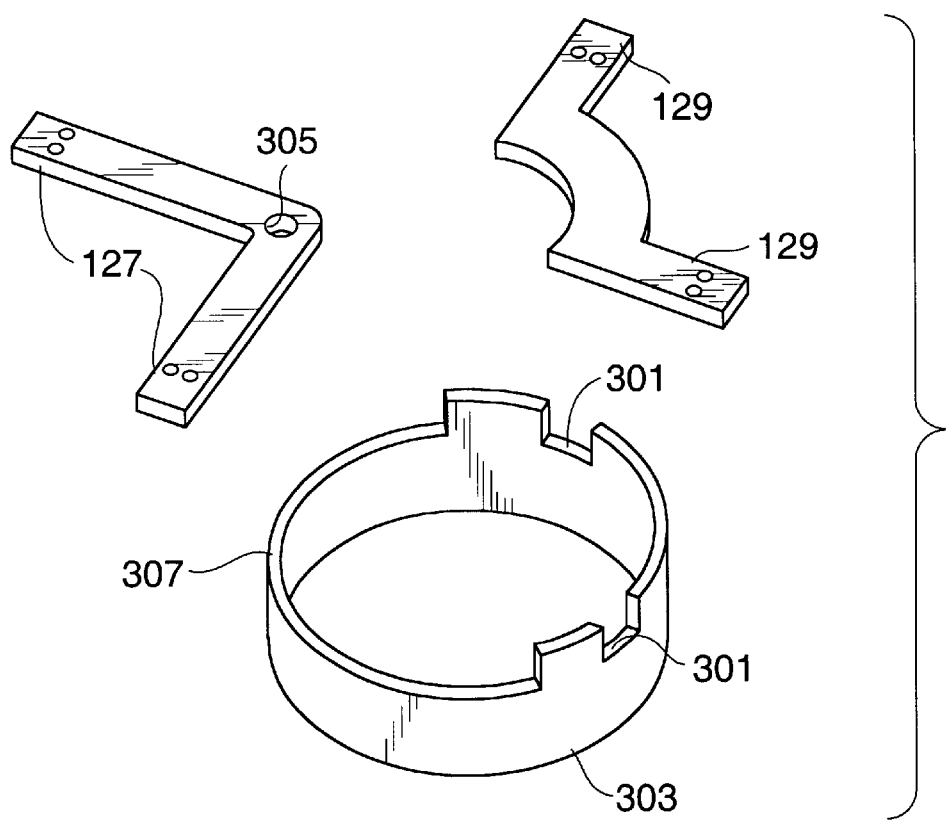
FIG. 3 is an illustration of a portion of the hub assembly of the game controller shown in FIGS. 1 and 2.

FIGS. 1–3 provide different views of a preferred embodiment of the invention. As shown in FIG. 1, a game controller 100 in accordance with the present invention includes a central portion or hub 101, a left handle 103 grippable by the user's left hand, and a right handle 105 grippable by the user's right hand. In this embodiment of the invention as in all other embodiments of the invention, the game controller is preferably held in the user's hands during game play. Accordingly, during use the game controller is not attached, affixed, clamped-to, or otherwise coupled to a rigid surface such as a desk, tabletop, or other stationary object nor does the game controller sit or rest unattached to such surface. Thus the user is able to vary the position of the game controller during game play, the flexibility in positioning the game controller being limited only by the length of the controller cable 107 (assuming a wired configuration). It should be understood, however, that a rear surface of at least a portion of the controller (e.g., hub 101) could include one or more attached pads (not shown) that would allow the user to rest the controller on a surface during game play if desired.

In the embodiment illustrated in FIGS. 1–3 as in all other embodiments of the invention, one portion of the game controller is held by one of the user's hands while the second portion of the game controller, held by the user's other hand, is free to rotate about a central axis point defined by the first portion. This configuration allows the game controller of the present invention to reproduce the rotational movement associated with a steering wheel, such as that commonly used with a car, boat, or similar apparatus, without requiring that the controller be pivotably mounted to a stationary base unit. Accordingly, in the embodiment illustrated in FIGS. 1–3, if the user holds handle 105 in their right hand, they can move handle 103 either clockwise in a direction 109 or counter-clockwise in a direction 111. The range of movement is limited by position stops fabricated into the device, for example such as the position stops described in more detail in relation to FIG. 3. In this embodiment, hub 101 is rigidly coupled to right handle 105. It is understood that the game controllers of the present invention can be either right-hand or left-hand centric, i.e., the game controller can be designed to allow either the right handle or the left handle to rotate about the hub and/or other handle.

In the illustrated embodiment, handle 105 includes a first button zone 113 and a second button zone 115, each easily accessible by the user's right thumb during game play. Preferably button zone 113 includes four analog buttons 117 (e.g., A, B, X, and Y). Preferably button zone 115 includes two analog buttons 119 (e.g., B and W). This embodiment also preferably includes two digital buttons 121. In at least one embodiment the game controller also includes a multi-pad 123, preferably controllable by the user's left thumb during play. Multipad 123 can be a multivalue generator, often referred to as a thumb ball control, and can be an analog multi-axis controller, a proportional multi-axis controller, or a similar device and can use Hall effect sensors, optical sensors, or other types of sensors. Alternately, multipad 123 can be a conventional four switch digital pad that generates or interrupts a signal when a contact is closed or opened and can be configured to generate only four primary directions or generate four primary directions plus four intermediate directions. Preferably game controller 100 also includes one or more visual indicators (e.g., a display) that provide feedback to the user. In the illustrated embodiment, at least one LED 125 provides the desired visual indicators.

As shown in FIGS. 1 and 2, handles 103 and 105 are coupled to hub portion 101 by sprockets 127 and 129, respectively. As shown in further detail in FIG. 3, sprockets 129 are captured within a pair of slots 301 within lower hub portion 303. In contrast, sprockets 127 are free to move about a pivot point 305 within a single slot 307, the ends of slot 307 providing the rotational limits to sprocket 127.

In the preferred embodiment of the invention, handle 103 is biased towards a central or null position, thus allowing substantially equal clockwise and counter-clockwise rotational movement from the central position and providing the user with a method of determining when the handle is in the null position. Alternately, the handle can be biased towards a non-central location, for example, biased towards the absolute clockwise position or the absolute counter-clockwise position. Alternately, no bias can be applied to the handle of the present invention, thus allowing the handle to freely rotate between the handle's stops or limits.

Figure 4:
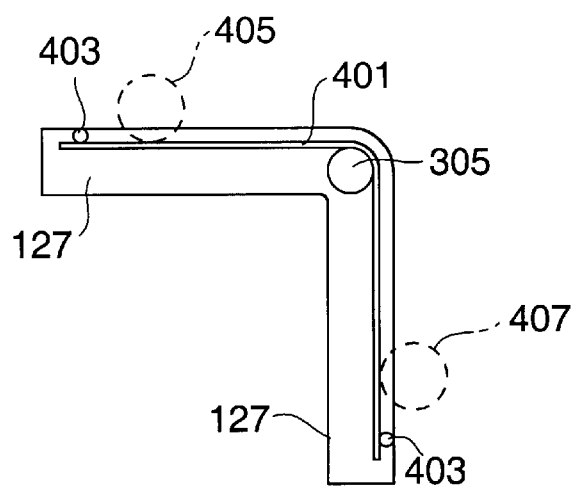
FIG. 4 illustrates a method of biasing the rotatable handle of the game controller shown in FIGS. 1–3 towards a null or central position.
Figure 5:
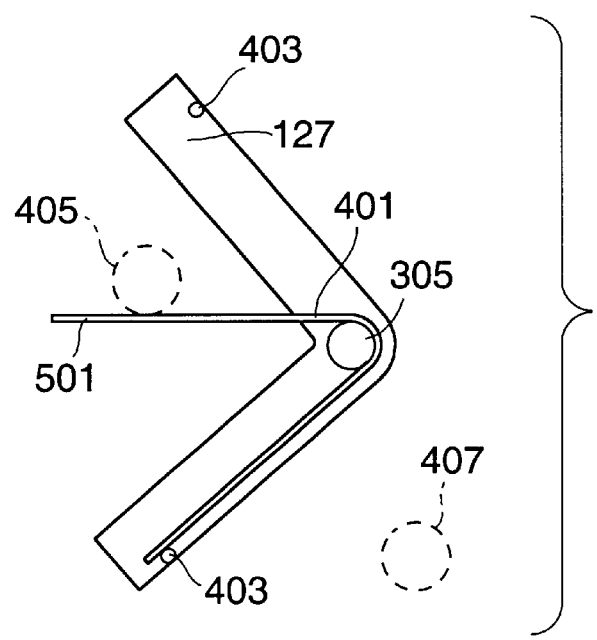
FIG. 5 illustrates the system shown in FIG. 4 when the rotatable handle is rotated in a clockwise direction.
Figure 6:
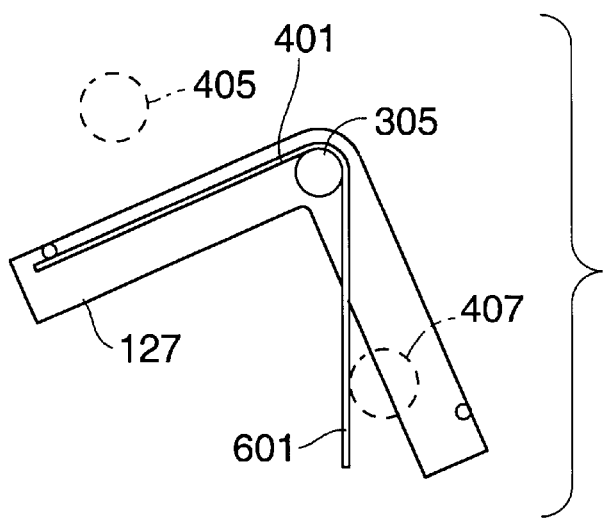
FIG. 6 illustrates the system shown in FIG. 4 when the rotatable handle is rotated in a counter-clockwise direction.

In the preferred embodiment of the invention, bias is applied to handle 103 by one or more spring elements. For example, as illustrated in FIG. 4, sprocket 127 can include a spring element 401 kept under tension by a pair of pins 403 rigidly coupled to sprocket 127. Pins 405 and 407 (shown in shadow) are coupled to hub 101 (not shown). When sprocket 127, and thus handle 103, is in the central or null position, pins 405 rest against spring element 401. When sprocket 127 is moved in a clockwise rotation as illustrated in FIG. 5, portion 501 of spring element 401 is deflected away from adjacent pin 403, putting spring element 401 under additional tension. As a result of the force applied to post 405 by spring element portion 501, when the force applied to handle 103 by the user is less than the force applied by the spring element, sprocket 127 returns to the defined null or central position. Similarly, when sprocket 127 is moved in a counter-clockwise rotation as illustrated in FIG. 6, portion 601 of spring element 401 is deflected away from adjacent pin 403, putting spring element 401 under additional tension and providing the necessary force to return the handle to the central position when the force applied to handle 103 by the user is less than the force applied by the spring element. It will be appreciated by those of skill in the relevant art that there are numerous methods of applying force to a pivotable member. For example, sprocket 127 can be biased using coiled springs (e.g., spiral or cylindrical), plate springs, compound springs, or elastomers. Additionally, with respect to springs, the springs can be loaded either in tension or in compression.

A sensor, coupled to sprocket 127 and thus handle 103, provides handle position information to the game controller and hence the game and/or computer to which the game controller is attached. In the preferred embodiment, sprocket 127 is coupled to a potentiometer, the potentiometer providing signals (e.g., resistance, current, voltage) proportional to the rotational position of the sprocket. Alternately, the sensor coupled to sprocket 127 can use Hall effect sensors, optical sensors, or other means of sensing the position of sprocket 127. The controller can be designed to provide a zero signal when handle 103 is in the central position, the extreme clockwise position, the extreme counter-clockwise position, or some other pre-defined position.

Figure 7:
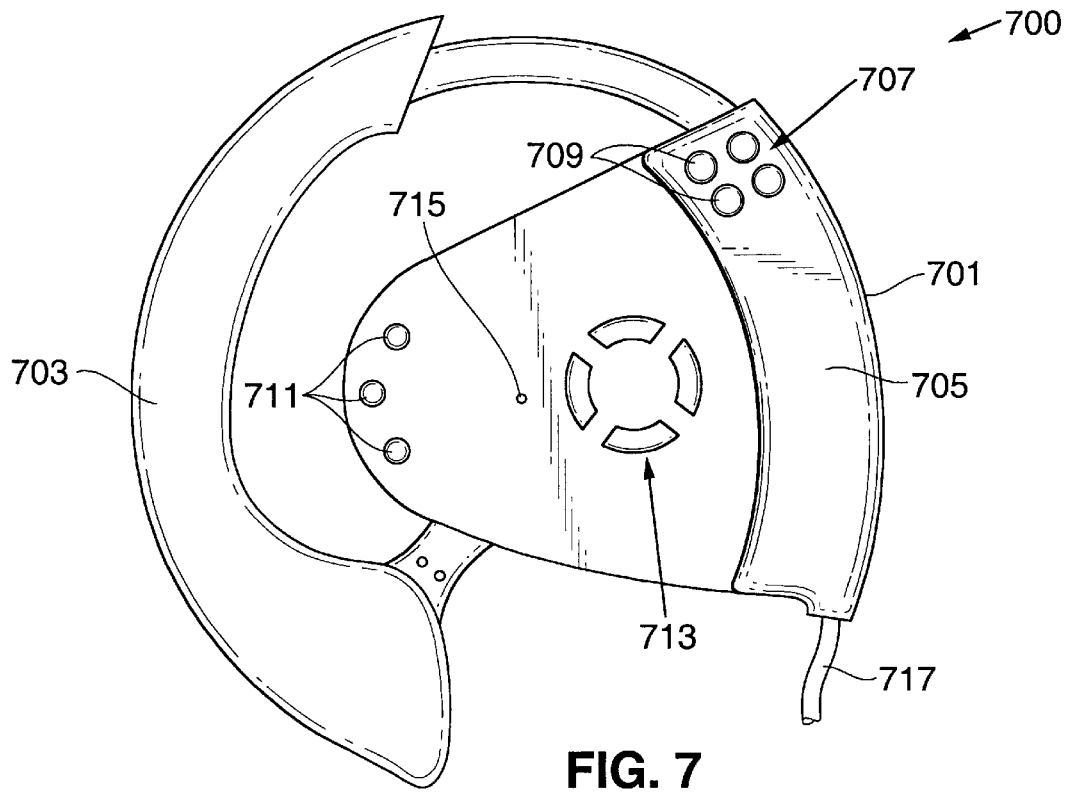
FIG. 7 is an illustration of the front of another embodiment of the invention.
Figure 8:
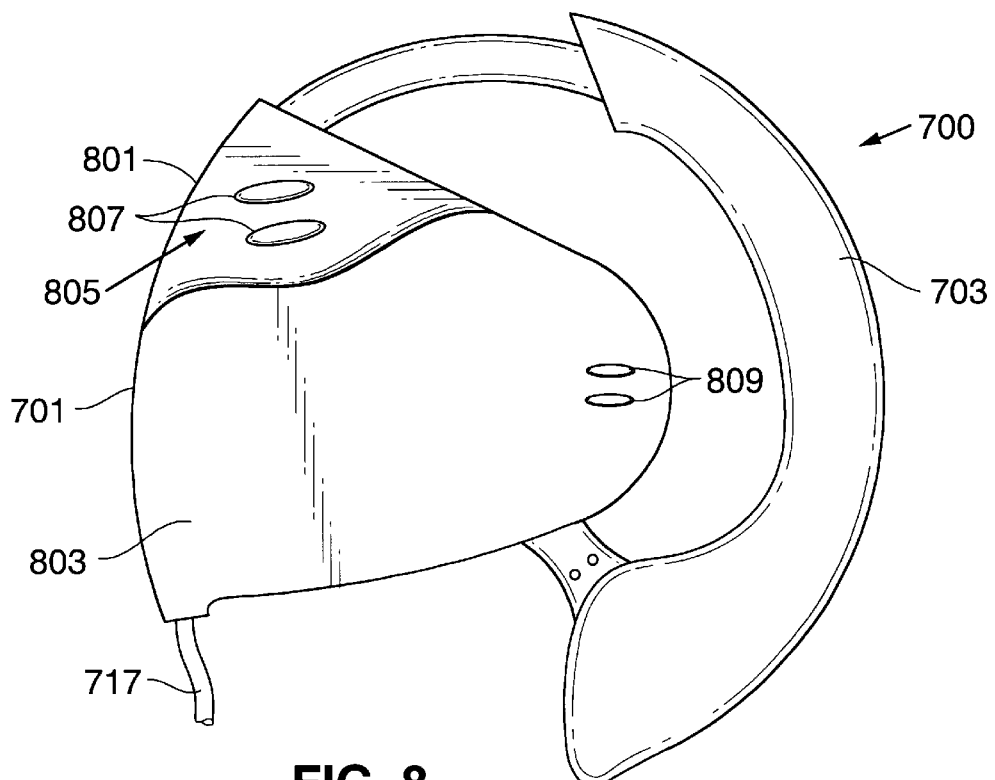
FIG. 8 is an illustration of the back of the embodiment shown in FIG. 7.

FIGS. 7 and 8 provide a front and rear view, respectively, of another preferred embodiment of the invention. As shown in FIG. 7, a game controller 700 includes a hub portion 701 grippable by the user's right hand and a left handle 703 grippable by the user's left hand. Preferably hub portion 701 includes a raised and curved portion 705 to aid the user in grasping the hub. Additionally, preferably the back surface of hub 701 includes a raised and contoured portion 801 such that the user's index finger rests naturally on portion 801 while the user's third, fourth, and fifth fingers rest naturally on portion 803. Accordingly, the combination of portion 705 and portion 801 serve as a handle, the handle being integral to the hub.

As illustrated, hub 701 includes a first button zone 707 easily accessible by the user's right thumb during game play. Preferably button zone 707 includes four analog buttons 709 (e.g., A, B, X, and Y). A second button zone 805 is positioned on the rear surface of hub 701, within region 801, providing easy user access via the user's index finger. Preferably button zone 805 includes two analog buttons 807 (e.g., B and W). This embodiment also preferably includes three digital buttons 711 accessible by the user's left thumb and two digital buttons 809 on the rear surface accessible by the user's left third or fourth fingers. In at least one embodiment the game controller also includes a multipad 713, controllable by either the user's right thumb (preferred) or left thumb during play. As in the previously described embodiment, multipad 713 can be a multivalue generator and can be an analog multi-axis controller, a proportional multi-axis controller, or a similar device and can use Hall effect sensors, optical sensors, or other types of sensors. Alternately, multipad 713 can be a conventional four switch digital pad that generates or interrupts a signal when a contact is closed or opened and can be configured to generate only four primary directions or generate four primary directions plus four intermediate directions. Game controller 700 also includes a single LED 715 that is used to indicate the game controller's status to the user. Although the controller can be wired or wireless, preferably the controller is wired and uses a cable 717 to couple the game controller to the desired personal computer or dedicated game system.

Figure 9:
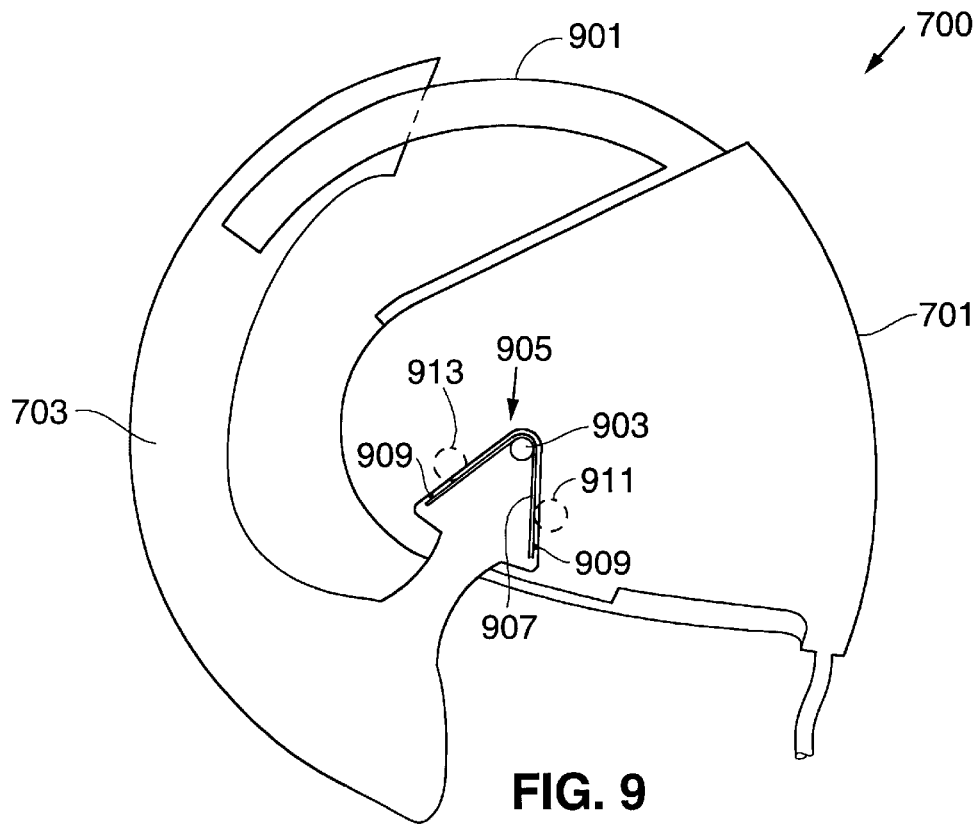
FIG. 9 is a cross-sectional view of the embodiment shown in FIGS. 7 and 8.

FIG. 9 is a cross-sectional view of the embodiment shown in FIGS. 7 and 8. In addition to providing space for the electronics associated with the game controller, hub portion 701 includes a rigidly coupled handle extension 901. Handle extension 901 provides support and as well as a guide for handle 703. In addition to being slidably coupled to handle extension 901, handle 703 is pivotably coupled to hub portion 701 about a pivot axis 903. Preferably a portion 905 of handle 703 includes a spring element 907 and spring capture pins or portions 909. Pins 911 and 913 (shown in shadow) are coupled to the front portion (not shown in this figure) of hub 701. As previously described relative to FIGS. 4–6, the combination of spring element 907 and pins 911/913 provide a means of urging handle 703 to a null or center position.

Figure 10:
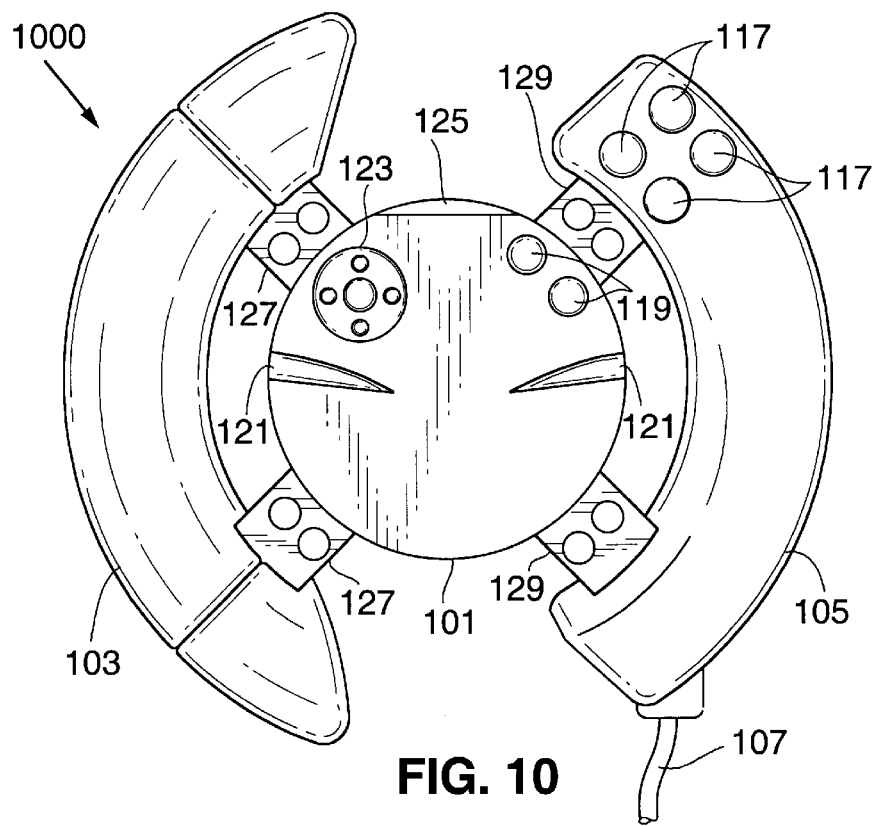
FIG. 10 is an illustration of the front of another embodiment of the invention.
Figure 11:
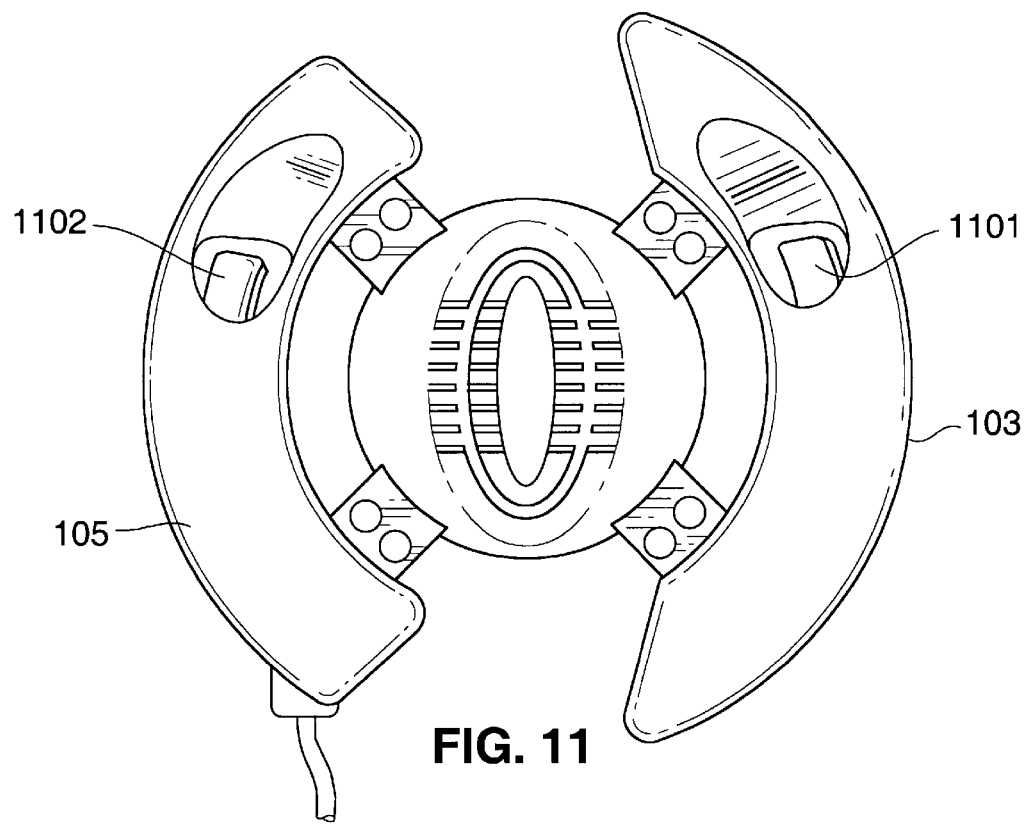
FIG. 11 is an illustration of the back of the embodiment shown in FIG. 10.

FIGS. 10 and 11 provide a front and rear view, respectively, of another preferred embodiment of the invention. As shown in FIG. 10, the front surface of game controller 1000 includes the same functionality as previously described relative to the embodiment shown in FIGS. 1–3. Additionally, and as described in detail relative to controller 100, controller 1000 is designed to allow the user to grip both handles, rotating one of the handles relative to the other. In addition, and as shown in FIG. 11, a pair of buttons 1101–1102 are positioned on the rear surfaces of left handle 103 and right handle 105, respectively. Preferably buttons 1101 and 1102, designed to be easily accessed by the index fingers of the user's left and right hands during game play, are analog buttons although they can also be configured as digital buttons. In at least one configuration, buttons 1101 and 1102 output a value corresponding to the amount of force applied by the user. In this configuration, preferably buttons 1101 and 1102 use force sensitive resistors and elastomeric materials as are well known in the art. It will be understood that other types of force sensitive buttons or triggers are known in the art and contemplated by the inventors. Additionally, it will be understood that force sensitive buttons, triggers or controllers can also be used in other embodiments of the invention.

Figure 12:
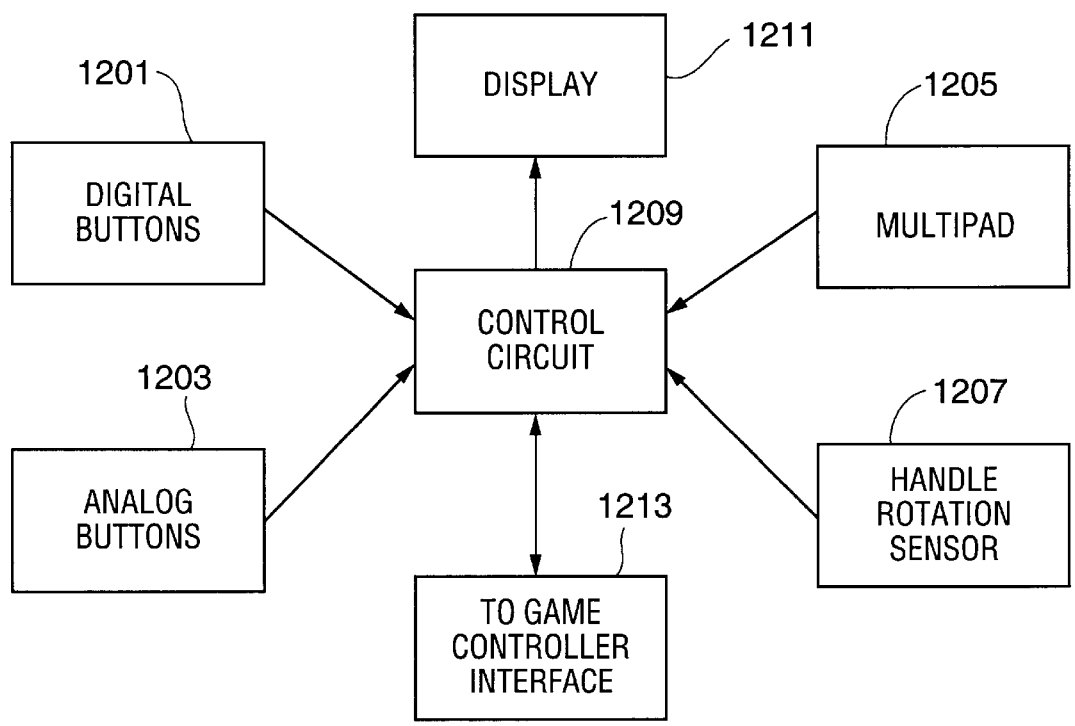
FIG. 12 is a block diagram of the electronic schematic for use with a game controller in accordance with the invention.

FIG. 12 is a block diagram of the electronic schematic for use with a game controller in accordance with the invention. As shown, digital switches 1201, analog switches 1203, multipad(s) 1205, and the handle rotation sensor 1207 are all coupled to a control circuit 1209. As previously described, the numbers and types of inputs for the game controller vary depending upon the desired game controller configuration. For example, game controller 100 includes digital switches 121, analog switches 117 and 119, and either a thumb ball control or a four switch digital pad (e.g., multipad sensor 123). Similarly, game controller 700 includes digital switches 711 and 809, analog switches 709 and 807, and either a thumb ball control or a four switch digital pad (e.g., multipad sensor 713). All embodiments of the invention include handle rotation sensor 1207. In addition, control circuit 1209 is also coupled to an indicator display(s) 1211 (e.g., display 125 or indicator LED 715).

Control circuit 1209 prepares the controls signals received from each input (e.g., 1201, 1203, 1205, and 1207), transmitting the signals to the personal computer, game system or other device coupled to the game controller via a game controller interface 1213. Accordingly, in at least one embodiment of the invention, control circuit 1209 converts multivalues such as those received from an analog or proportional controller into digital values. The converted digital values along with the digital values generated by any digital switches of the game controller are serialized into at least one digital stream. Alternately, the control signals received from each of the game controller's input devices can be directly coupled to personal computer or game system. Preferably the personal computer or game system uses a software driver to interface with and control the game controller. For example, the driver may decode the at least one serialized digital stream As will be understood by those familiar with the art, the present invention may be embodied in other specific forms without departing from the spirit or essential characteristics thereof. For example, buttons contained on the game controller can be analog or digital, pre-programmed or user programmable, and can be configured in a variety of ways to include different numbers, sizes, shapes, button zone groupings, and/or locations. Additionally, the game controller can utilize different methods of rotating one controller handle relative to the other handle. Accordingly, the disclosures and descriptions herein are intended to be illustrative, but not limiting, of the scope of the invention which is set forth in the following claims.

What is claimed is:

1. A game controller comprising:
   a first handle grippable by a first hand of a user;
   a second handle rotatably coupled to said first handle and grippable by a second hand of said user, wherein said second handle rotatably pivots about a pivot point defined by said first handle; and
   a sensor coupled to said second handle, said sensor generating second handle position information, wherein said game controller is unattached to a stationary surface during use, and wherein said sensor generates a left control signal when said second handle is rotated in a counter-clockwise motion relative to said first handle and relative to a null position, and wherein said sensor generates a right control signal when said second handle is rotated in a clockwise motion relative to said first handle and relative to said null position.

2. The game controller of claim 1, further comprising a hub rigidly coupled to said first handle, wherein said pivot point is within said hub.

3. The game controller of claim 1, further comprising a hub portion integral to said first handle, wherein said pivot point is within said hub portion.

4. The game controller of claim 1, further comprising means for urging said second handle to said null position.

5. The game controller of claim 4, wherein said null position is substantially midway between an extreme clockwise position of said second handle relative to said first handle and an extreme counter-clockwise position of said second handle relative to said first handle.

6. The game controller of claim 4, wherein said urging means is comprised of at least one spring element.

7. The game controller of claim 4, wherein said urging means comprises:
   a spring element flexibly coupled to said second handle, wherein a first pinning portion rigidly coupled to said second handle and a second pinning portion rigidly coupled to said second handle define a spring element static position;
   a first deflection pin rigidly coupled to said first handle, wherein clockwise motion of said second handle relative to said first handle deflects a first portion of said spring element from said spring element static position; and
   a second deflection pin rigidly coupled to said first handle, wherein counter-clockwise motion of said second handle relative to said first handle deflects a second portion of said spring element from said spring element static position.

8. The game controller of claim 4, wherein said urging means is comprised of at least element selected from the group consisting of coiled springs, plate springs, compound springs and elastomers.

9. The game controller of claim 4, wherein said urging means comprises:
   a spring element flexibly coupled to said second handle, wherein a first pinning portion rigidly coupled to said second handle and a second pinning portion rigidly coupled to said second handle define a spring element static position;
   a first deflection pin rigidly coupled to a hub portion integral to said first handle, wherein clockwise motion of said second handle relative to said first handle deflects a first portion of said spring element from said spring element static position; and
   a second deflection pin rigidly coupled to said hub portion integral to said first handle, wherein counter-clockwise motion of said second handle relative to said first handle deflects a second portion of said spring element from said spring element static position.

10. The game controller of claim 1, further comprising:
   a hub rigidly coupled to said first handle, wherein said pivot point is within said hub;
   a spring element flexibly coupled to said second handle, wherein a first pinning portion rigidly coupled to said second handle and a second pinning portion rigidly coupled to said second handle define a spring element static position;
   a first deflection pin rigidly coupled to said hub, wherein clockwise motion of said second handle relative to said first handle deflects a first portion of said spring element from said spring element static position, wherein said spring element applies force to said first deflection pin, said applied force urging said second handle to said null position; and
   a second deflection pin rigidly coupled to said hub portion integral to said first handle, wherein counter-clockwise motion of said second handle relative to said first handle deflects a second portion of said spring element from said spring element static position, wherein said spring element applies force to said second deflection pin, said applied force urging said second handle to said null position.

11. The game controller of claim 1, wherein said sensor further comprises a potentiometer.

12. The game controller of claim 1, wherein said sensor is selected from the group of sensors consisting of Hall effect sensors and optical sensors.

13. The game controller of claim 1, further comprising a button zone integral to said first handle, wherein said button zone is accessible by a thumb of the user when the first handle is gripped.

14. The game controller of claim 2, further comprising:
   a first button zone integral to said first handle, wherein said first button zone is accessible by a thumb of the user when the first handle is gripped; and
   a second button zone integral to said hub, wherein said second button zone is accessible by a thumb of the user when the first handle is gripped.

15. The game controller of claim 3, further comprising:
   a first button zone integral to said first handle, wherein said first button zone is accessible by a thumb of the user when the first handle is gripped; and
   a second button zone integral to said hub portion, wherein said second button zone is accessible by a thumb of the user when the first handle is gripped.

16. The game controller of claim 1, further comprising:
   a first button zone integral to said first handle, wherein said first button zone is accessible by a thumb of the user when the first handle is gripped; and
   a second button zone integral to said first handle, wherein said second button zone is accessible by an index finger of the user when the first handle is gripped.

17. The game controller of claim 1, further comprising a multipad, said multipad comprised of a multivalue generator.

18. The game controller of claim 17, wherein said multipad is accessible by a thumb of the user when the first handle is gripped.

19. The game controller of claim 17, wherein said multipad is accessible by a thumb of the user when the second handle is gripped.

20. The game controller of claim 1, further comprising at least one indicator light.

21. The game controller of claim 1, further comprising a control circuit, said control circuit producing at least one digital data stream.

22. A game controller comprising:
   a hub;
   a first handle rigidly coupled to said hub and grippable by a first hand of a user;
   a second handle rotatably coupled to said first handle and grippable by a second hand of said user, wherein said second handle rotatably pivots about a pivot point within said hub, wherein said game controller is unattached to a stationary surface during use;
   a sensor coupled to said second handle, said sensor generating a left control signal when said second handle is rotated in a counter-clockwise motion relative to said first handle and relative to a null position, and wherein said sensor generates a right control signal when said second handle is rotated in a clockwise motion relative to said first handle and relative to said null position;
   a spring element coupled to said second handle, said spring element urging said second handle to said null position;
   a button zone integral to said first handle, wherein said button zone is accessible by a thumb of the user when the first handle is gripped; and a control circuit for communicating said left and right control signals to a game system.

23. A game controller comprising:

a hub, wherein a holding region of said hub is grippable by a first hand of a user;

a second handle rotatably coupled to said hub and grippable by a second hand of said user, wherein said second handle rotatably pivots about a pivot point within said hub, wherein said game controller is unattached to a stationary surface during use;

a sensor coupled to said second handle, said sensor generating a left control signal when said second handle is rotated in a counter-clockwise motion relative to said hub and relative to a null position, and wherein said sensor generates a right control signal when said second handle is rotated in a clockwise motion relative to said hub and relative to said null position;

a spring element coupled to said second handle, said spring element urging said second handle to said null position;

a first button zone integral to a front surface of said hub, wherein said first button zone is accessible by a thumb of the user when the holding region of said hub is gripped;

a second button zone integral to a back surface of said hub, wherein said second button zone is accessible by an index finger of the user when the holding region of said hub is gripped; and a control circuit for communicating said left and right control signals to a game system.

24. A method of generating control signals for transmission to a gaming system for the purpose of simulating directional control of a vehicle, comprising the steps of:

gripping a first handle with a first hand of a user;

gripping a second handle with a second hand of a user, wherein said first and second handles are uncoupled to a stationary object surface;

generating a right control signal upon rotating said second handle in a clockwise motion relative to said first handle; and generating a left control signal upon rotating said second handle in a counter-clockwise motion relative to said first handle.

* * * * *